United States Patent [19]

Bailey

[11] 4,153,412

[45] May 8, 1979

[54] PROCESS FOR PRINTING REFLECTIVE SHEET MATERIAL

[75] Inventor: Terry R. Bailey, Cottage Grove, Minn.

[73] Assignee: Minnesota Mining and Manufacturing Company, St. Paul, Minn.

[21] Appl. No.: 790,601

[22] Filed: Apr. 25, 1977

[51] Int. Cl.$^2$ .................. D06P 5/00; G02B 5/128
[52] U.S. Cl. ................... 8/2.5 A; 350/97; 350/105; 428/323
[58] Field of Search .................. 8/2.5 A; 350/105

[56] References Cited

U.S. PATENT DOCUMENTS

| | | | |
|---|---|---|---|
| 2,403,752 | 7/1946 | Phillippi | 350/105 |
| 2,646,364 | 7/1953 | Porth | 350/105 |
| 3,707,346 | 12/1972 | Markert et al. | 8/2.5 A |
| 3,829,286 | 8/1974 | Anzai et al. | 8/2.5 |
| 4,012,562 | 7/1978 | Harper et al. | 350/105 |

*Primary Examiner*—A. Lionel Clingman
*Attorney, Agent, or Firm*—Cruzan Alexander; Donald M. Sell; Gerald F. Chernivec

[57] ABSTRACT

A process for imparting colored image patterns to an exposed lens retroreflective sheet material comprising disposing a preprinted sublimable-dye source sheet over the exposed lens surface under sufficient pressure to insure intimate contact therebetween, and heating the source sheet to the dye sublimation temperature, whereupon the retroreflective sheet becomes visibly patterned with the pattern on the source sheet.

8 Claims, No Drawings

PROCESS FOR PRINTING REFLECTIVE SHEET MATERIAL

BACKGROUND OF THE INVENTION

This invention relates to providing vivid coloration and graphic intelligence to exposed lens retroreflective sheet constructions, and the resultant constructions.

Exposed lens retroreflective sheet constructions typically contain small spherical lens elements, i.e., small glass microspheres or bends hemispherically embedded in a suitable binder system, and specularly reflecting materials adjacent or on the rear surface of the lens elements, such as disclosed in U.S. Pat. Nos. 3,700,305 and 3,758,192. In use, as light is shined directly on the retroreflective material, the light is reflected back to the source and provides a great deal of illumination to the object containing the retroreflective material thereon. Such materials are commonly used in a variety of constructions, such as street and highway markings, as reflective portions on garments, etc.

The imparting of coloration and graphic intelligence to such retroreflective sheet materials has typically been undertaken by applying some to the backside of the sheet material and using transparent specular reflector and binder material. For example, in U.S. Pat. No. 3,700,305, the specular reflector and binder material can be transparent to light, such that by applying decorative effects to the backside of the sheet material, such effects can be visible under normal light.

Application of coloration via silk screening with colored inks, etc. to the exposed lens surface has been undertaken, but is undesirable in most instances, since retroreflection is virtually eliminated in the inked areas.

In commonly assigned U.S. application Ser. No. 695,974, filed June 14, 1976, there is disclosed a process for printing a colored image-containing transfer layer over a portion of the specularly reflective layer on the spherical lens elements, such that when transfer is undertaken to a substrate, the colored image-containing portions are effectively transferred and are also retroreflective.

It has now been found that a finished non-colored or white exposed lens retroreflective sheeting can be colored or a graphic intelligence imparted thereto by utilization of vapor dye transfer techniques. By utilizing such techniques an end-user can add coloration in-house to the sheeting instead of having to settle for add-on colorations or obtaining same from a supplier's limited selection.

SUMMARY OF THE INVENTION

In accordance with the invention, a process for imparting colored image patterns to exposed lens retroreflective sheet material is provided. Such sheet material comprises a dense monolayer of transparent microspheres partially embedded in, and partially exposed above, a binder composition, with a specularly reflective material disposed adjacent the embedded portions of the microspheres. The binder composition is adapted to receive and retain vapor phase dye stuff throughout its thickness, including portions underlying the microspheres. The process comprises disposing a preprinted sublimable dye-containing source sheet over the exposed lens surface at sufficient pressure to insure intimate contact therebetween, heating the source sheet to the sublimation temperature of the dye, and removing the source sheet, whereby the retroreflective sheet material is visibly patterned with the pattern contained on the dye source sheet. In this manner, vividly colored designs can be applied to retroreflective sheeting.

In the case of reflectorizing a fabric garment, the retroreflective material can be applied to a portion of the fabric from which the garment is made, following which the vapor phase coloring process can be undertaken to impart a uniform visible color pattern to the fabric, including the portion which contains the retroreflective material.

DETAILED DESCRIPTION OF THE INVENTION

The preferred exposed lens retroreflective material useful herein is disclosed in U.S. Pat. No. 3,700,305. The construction therein contains glass beads or microsphere lens elements of from 10 to 200 or more microns diameter (preferably 25 to 75 microns) and has adjacent specularly reflecting material comprising transparent dielectric mirrors. Such dielectric mirrors comprise at least one thin transparent layer having an optical thickness corresponding to an odd-numbered multiple of about one-quarter wavelength of light in the wavelength range of about 3800 to about 10,000 angstroms. The transparent layer has a reflective index of $n_1$, the faces of the layer being in contact with materials of refracted indices $n_2$ and $n_3$, both $n_2$ and $n_3$ being at least 0.1 (and preferably at least 0.3) either higher or lower than $n_1$. Preferably, two or more contiguous transparent layers are utilized to obtain higher reflectivity, each layer being in contact with materials having a refractive index that is at least 0.1 (and preferably 0.3) either higher or lower than the refractive index of the adjacent layers.

The resulting specular reflector comprises an array of materials, in layer form, having an alternating sequence of refractive indices. The various layers are conveniently formed on the glass microspheres subsequent the microspheres having been temporarily substantially hemispherically embedded into a heated plastic coated web, by a vapor deposition in one or more steps to provide the desired number of layers in the alternating sequence of refractive index. Following the buildup of the transparent dielectric mirror materials, the thus-coated glass beads or microspheres are typically coated with an organic resinous binder material, followed by drying or curing, after which an adhesive coating can be overlaid on the binder. The plastic coated web is then removed from the spheres.

Useful materials for providing the transparent layers (generally by vapor deposition), include high-refractive-index materials such as zinc sulfide, zinc selenide, and bizmuth oxide, and low-index materials such as cryolite, magnesium fluoride and silicon dioxide.

While transparent under ordinary diffused lighting conditions, the dielectric mirror also reflects a large enough percentage of light by phase agreement or enhancement of reflection from the interfaces of the transparent layer or layers to provide bright retroreflection of light beamed at the mirror.

While transparency of the specular reflector is preferable, since the coloration as provided by the process of the invention will be more vivid, the invention will also function where a non-transparent reflective layer, e.g., vapor-coated aluminum, is utilized.

An alternative exposed lens retroreflective construction useful in the invention is that disclosed in U.S. Pat. No. 3,758,192. In that construction, the binder material contains specularly reflective nacreous pigment particles which provide a tangential, preferably contiguous, cup-like surface contact with the under surface of the glass beads to form reflex-reflecting elements therewith.

In the process of the invention, a preprinted sublimable dye-containing source sheet is placed in contact with the exposed microsphere or bead surface under sufficient pressure to insure intimate contact therebetween, typically from about 0.5 to about 10 psi. The sanwich is then heated to the dye sublimation temperature, whereupon the dye effectively transmits into the retroreflective sheet material, in essence transferring to the organic resinous binder material in between each bead. With continued heating, the dye migrates to the back of the bead, but does not interfere with the optical characteristics of the retroreflective construction, i.e., retroreflectivity is not inhibited. The resultant construction is then brightly colored with a solid or graphic pattern having essentially same retroreflective properties as before coloration. For use herein, the term "pattern" corresponds to solid coloration as well as colored graphic images.

Suitable volatilizable dyes are those with sublimation temperatures between about 50° C. and about 250° C. Furthermore, when a garment is the desired end product, the dye should be wash-fast, i.e., not degradable or capable of deteriorioating on washing, and should not be degradable when exposed to ultraviolet light. There are many suitable dyes known in the art having these characteristics. They can be generally classified as solvent dyes, disperse dyes, or basic dyes, and have been found useful in transfer printing of textiles such as disclosed in "Dyes For Heat Transfer Printing" by J. Aihara et al, American Dye Stuff Reporter, February, 1975 at pages 46–52. Examples of typical dyes useful in my invention include the following:

| YELLOW DYES | |
|---|---|
| Oil Yellow GR | C.I. 21240 |
| Intratherm Yellow P-345NT | C.I. Disperse Yellow 3 |
| Waxoline Yellow T | C.I. |
| Irgacet | |
| Ingracet Yellow 3GCG | C.I. Solvent Yellow 48 |
| Cibacet Yellow GWL | C.I. 10338 |
| Cibacet Golden Yellow 3R | C.I. Disperse Yellow 56 |
| ORANGE DYES | |
| Brilliant Fast Orange 2R | C.I. Solvent Orange 34 |
| Amasolve Orange EE | C.I. Disperse Orange 3 |
| Dispersol Fast Orange B | C.I. 26080 |
| Cibacet Brown 2RFL | C.I. Disperse Orange 30 |
| Eastman Polyester Orange GR-LSW | C.I. Disperse Orange 57 |
| RED DYES | |
| Polacet Scarlet GF2R | C.I. Disperse Red 54 |
| Amasolve Scarlet 2B | C.I. Disperse Red 7 |
| Cibacet Red 3BL | C.I. Disperse Red 82 |
| Genacron Pink RL | C.I. Disperse Red 86 |
| Sudan Red GGA | C.I. 21250 |
| VIOLET DYES | |
| Sudan Irisol | |
| Eastman Polyester Bordeaux 2B-LSW | C.I. Disperse Violet 44 |
| Amasolve Violet B | C.I. Disperse Violet 27 |
| Eastman Polyester Rubine R-LSW | C.I. Disperse Violet 42 |
| BLUE DYES | |
| Colliton Blue Green B | C.I. 62500 |
| Amasolve Blue BG | C.I. Disperse Blue |
| Cibacet Blue 2R | C.I. 61525 |
| Resoform Blue GL | C.I. 61525 |
| Eastman Fast Blue GLF | C.I. 60767 |
| Genacron Blue BRL | C.I. Disperse Blue 95 |
| GREEN DYES | |
| Sudan Green 4B | C.I. Solvent Green 3 C.I. 61565 |
| BROWN DYES | |
| Brilliant Vat Brown FR | C.I. Solvent Brown 9 |
| Latyl Brown MS | C.I. Disperse Brown 2 |

Other exemplary dyes are provided in American Dye Stuff Reporter, July, 1974 at pages 22–28 and 64; and the Journal of the Society of Dyers and Colorists, December, 1971 at pages 494.

The volatilizable dyes are typically applied to a web such as a sheet, a foil or a woven or non-woven web of synthetic or natural fiber. Preferably, the web consists of paper because the dye has a low affinity of the cellulose therein. The web should be of sufficient thickness to provide dimensional stability to the dye source material during the imaging process.

Printing of the dye itself onto the dye source, i.e., a paper web, is easily accomplished using any of the traditional ink printing methods, e.g., rotogravure, flexography, silk screen, or offset. The ink is normally produced from a dye having suitable aforementioned characteristics and a vehicle to facilitate the application of the dye to the paper. Typically this vehicle is cellulose-based, such as ethyl cellulose or cellulose acetate propionate because of its very low affinity for the volatile dye. Preprinted dye source sheets are commercially available.

The binder material used in the retroreflective sheet construction should be an organic composition in which the sublimed dye is soluble, at sublimation temperatures, without distortion or degradation of the optical qualities of the sheet, and in which the dye can be retained during conditions of light exposure, high heat, and washing (in the case of a garment). Furthermore, the organic binder should be capable of withstanding the dye sublimation temperatures without discoloration and/or excessive softening to the point that the microspheres submerge completely into the binder.

Additionally, the binder must exhibit other properties depending on the ultimate usage of the retroreflective material. For example, if utilized as garment trim, the binder should be relatively soft and flexible, resistant to washing and dry cleaning, reasonably weather resistant, non-toxic, ironable, abrasion-, soil-, and stain-resistant etc. If utilized for outdoor traffic signs, more stringent weatherability criteria would be necessary.

Since the dyes listed above are relatively non-polar, suitable binder materials are relatively non-polar, i.e., they do not contain a predominance of ionic groups therein. Exemplary materials include saturated polyester resins, elastomeric polyurethanes, and polyvinyl chloride resins, although exact selection will in part depend on the ultimate use of the retroreflective material.

In the preferred utility, i.e., as a garment trim, prior art binders have not been found to be able to withstand the dye transfer temperatures without excessive softening, to the point where the glass spheres are forced completely into the binder, the binder thus contacting and adhering to the dye source web. Besides problems with web removal and reduction in retroreflectivity, uniformity of dye transfer in such a situation is extremely poor due to entrapment of air between the source web and the surface of the retroreflective sheeting, preventing effective transfer of the volatilized dye.

One solution has been to utilize resin binder, in a very thin layer, which is too thin to allow complete submergence of the beads therein. A second solution is to utilize crosslinking and/or thermosetting resins to effectively avoid or minimize the softening problems, e.g., isocyanate-crosslinked urethane elastomer resin systems.

In operation, the dye source web is contacted with the top surface of the retroreflective material under sufficient heat and pressure to cause sublimation of the dye into the retroreflective composite. The contact time necessary for production of a visible color or pattern by transfer of sublimed dyes has been ascertained to be from about 2 seconds to about 60 seconds with from about 10 to about 30 seconds being preferred. Decreasing contact times tend to reduce image density and resolution below optimum, whereas contact times greater than about 60 seconds tend to be impractical.

Contact pressures should be sufficient to insure intimate contact and eliminate air between the composite structures to thereby optimize uniformity of the dye transfer. A pressure on the composite of greater than about one-half pound per square inch is adequate for insuring this contact. Increasing pressure up to about 12 pounds per square inch may provide some minor increase in color density, but beyond that point minimal beneficial effect is noted.

The invention will now be more specifically illustrated by the use of the following non-limiting examples, wherein all parts are by weight unless otherwise indicated.

EXAMPLE 1

Transparent glass microspheres having an index of refraction of 1.92 and an average diameter of about 50 microns were cascaded onto a preheated polyethylene coated Kraft paper and the paper then passed through an oven heated to 121° C. for about one and one-half minutes. During passage through the oven the microspheres sank to a depth of about 30 percent of their diameters in the polyethylene layer. A transparent dielectric mirror was prepared as generally described in U.S. Pat. No. 3,700,305 by first vapor depositing a layer of cryolite ($Na_3AlF_6$) onto the microsphere covered surface of the web in an optical thickness (i.e., the product of physical thickness and index of refraction) corresponding to about one-quarter wavelength of white light, i.e., about one-quarter of 5500 angstroms, which is in the middle of the wavelength spectrum of visible light. Zinc sulfide was then vapor deposited onto the cryolite-coated microsphere surface in an optical thickness again corresponding to about one-quarter wavelength of white light.

A solution was then made from 30 parts of Vitel PE307 resin, tradename for a linear saturated polyester resin made by Goodyear Chemical Co., 35 parts of toluol and 35 parts of cyclohexanone, and 2 parts of Z6040 Silane (tradename of gamma-glycidoxypropyltrimethoxysilane, made by Dow Corning Corp.). This solution was knife coated onto the cryolite and zinc sulfide coated microsphere surface using a knife coater at a coating orifice of 0.006 inch, followed by drying for 5 minutes at 65° C. and 10 minutes at 93° C. The web was then laminated to a backing fabric by placing the coated side of the web in contact with a woven fabric of about 4 ounces per square yard consisting of a 65/35 by weight blend of polyester/cotton fibers and hot laminating, using a Model HP-7 Thermopress, available from the Thermopatch Corp., at about 10 psi pressure and 149° C., for 14 seconds.

After cooling, the polyethylene coated Kraft paper was removed. The white retroreflective fabric construction was then colored by first placing a sample of commercially available printed heat transfer paper, Ortherm Paper available from the Orchard Corp., in contact with the exposed beaded side of the retroreflective fabric construction, then applying about 10 psi pressure and about 204° C. of heat for 45 seconds on a Thermopress. After pressing, the spent dye source web was easily removed and the retroreflective fabric was brightly colored with little or no loss in retroreflective brilliance.

The Z-6040 was utilized to promote adhesion of the binder material to the coated bead surface.

EXAMPLE 2

A sheeting was prepared as per Example 1 up through the zinc sulfide coating. A solution of a thermoset resin system was then prepared consisting of 12 parts Vitel VPE 5545 resin, 18 parts Estane 5703 resin (an elastomeric polyurethane resin made by B. F. Goodrich Chem. Co.), 35 parts methylethylketone, 35 parts dimethyl formamide, 3 parts Cymel 301 (a melamine resin from American Cyanamide), 0.12 parts para toluene sulfonic acid (a catalyst for initiating the melamine crosslinking resin), 2 parts Z6040, and 1.2 parts Desmodur E22 (an aromatic polyisocyanate prepolymer made by Mobay Chem. Corp.). This was then knife coated at a 0.006 inch orifice onto the cryolite and zinc sulfide coated sheet and dried for 5 minutes at 65° C. and 10 minutes at 93° C.

A second solution was knife coated onto the web at an 0.006 inch coating orifice and dried 5 minutes at 65° C. and 10 minutes at 93° C. This solution consisted of 20.2 parts of Estane 5713 resin, 4.8 parts of Rutile titanium dioxide, 23.6 parts of dimethyl formamide, and 51.4 parts of methyl ethyl ketone.

This second coating was utilized as an adhesive system to adhere the retroreflective material to a fabric. The titanium dioxide imparts a white color to the adhesive layer, which when placed behind the transparent binder layer, reinforces the color formed from the sublimation printing step.

This sample was hot laminated to the same fabric used in Example 1. Lamination was undertaken on a Thermopress using about 10 psi pressure for 10 seconds at about 204° C. The polyethylene-coated Kraft paper was then removed and the remaining white retroreflective fabric construction was sublimation printed using the dye source paper of Example 1. The dye source web was placed in contact with the beaded side of the retroreflective fabric construction and the dye transferred by using a Thermopress at about 10 psi pressure for 45 seconds at about 204° C. The spent dye source web was then easily removed and the resultant retroreflective fabric construction was brightly colored with little or no loss in retroreflective brilliance.

EXAMPLE 3

The retroreflective construction of Example 1 was repeated, and again the construction was laminated to a 4 oz. 65/35 polyester/cotton blend fabric, but only a narrow strip of the retroreflective sheeting was laminated to a much larger piece of fabric. After lamination, the polyethylene coated Kraft paper was removed. The entire portion of fabric (including the narrow strip of retroreflectorized area) was then sublimation printed. After printing, the retroreflectorized area blended into the remainder of the fabric because both the fabric and reflectorized portion were printed with the same pattern held in registry, and both portions retained approximately the same coloration, i.e., the pattern was substantially uniform.

What is claimed is:

1. A process for imparting colored designs to exposed lens retroreflective sheet material, said material comprising
   a support film, at least an outer stratum of which is optically clear, a dense monolayer of transparent microspheres partially embedded in, and partially exposed above, said stratum, with a specularly reflective material disposed adjacent the embedded portions of said microspheres, said stratum comprising an organic binder composition adapted to receive and retain vapor phase dyestuff throughout its thickness, including portions underlying the microspheres, without affecting the retroreflectivity of said sheet material, the process comprising:
   (a) disposing a preprinted sublimable dye-containing source sheet over the exposed lens surface of said retroreflective sheet materials, and
   (b) applying sufficient pressure to said source sheet to insure intimate contact between said retroreflective sheet material and said source sheet, and
   (c) applying sufficient heat to said source sheet to cause sublimation of said sublimable dye into said retroreflective sheet, and
   (d) removing the source sheet from the retroreflective sheet,
   whereupon said retroreflective sheet material becomes visibly patterned with the pattern on the preprinted source sheet.

2. Process of claim 1 wherein said specularly reflective material comprises a coating on said microspheres, said coating comprising a thin transparent layer having a refractive index $n_1$, the faces of said transparent layer being in contact with materials of refractive index $n_2$ and $n_3$, both $n_2$ and $n_3$ being at least 0.1 either higher or lower than $n_1$, and the transparent layer having an optical thickness corresponding to an odd-numbered multiple of about one-quarter wavelength of light in the wavelength range of about 3800 to 10,000 angstroms.

3. The process of claim 1 wherein said binder composition comprises a thermoset resin system.

4. A retroreflective sheet material having visible colored pattern thereon prepared by the process of claim 1.

5. A process for retroreflectorizing a fabric material while not significantly disturbing the appearance of the fabric, comprising
   (a) adhering over limited portions of the fabric a retroreflective sheet material that is adherable to the fabric and that comprises
      a support film, at least an outer stratum of which is optically clear,
      a dense monolayer of transparent microspheres partially embedded in, and partially exposed above, said stratum, and
      a specularly reflective material disposed adjacent the embedded portions of said microspheres, said stratum comprising an organic binder composition adapted to receive and retain vapor phase dye stuff throughout its thickness, including portions underlying the microspheres, without affecting the retroreflectivity of said sheet material, and
   (b) disposing a preprinted sublimable dye-containing source sheet against said fabric, such that the source sheet overlies portions of the fabric covered by said retroreflective sheet material and surrounding portions of the fabric, and
   (c) applying sufficient pressure to said source sheet to insure intimate contact between said source sheet and said fabric, and
   (d) applying sufficient heat to said source sheet to cause sublimiation of said sublimable dye into said fabric,
   whereupon the retroreflective sheet material and surrounding fabric become visibly patterned with the pattern of the source sheet.

6. A fabric having retroreflective portions thereon and a colored design prepared by the process of claim 5.

7. The process of claim 5 wherein said specularly reflective material comprises a coating on said microspheres, said coating comprising a thin transparent layer having a refractive index $n_1$, the faces of said transparent layer being in contact with materials of refractive index $n_2$ and $n_3$, both $n_2$ and $n_3$ being at least 0.1 either higher or lower than $n_1$, and the transparent layer having an optical thickness corresponding to an odd-numbered multiple of about one-quarter wavelength of light in the wavelength range of about 3800 to 10,000 angstroms.

8. The process of claim 5 wherein said binder composition comprises a thermoset resin system.

* * * * *